Figure 1:
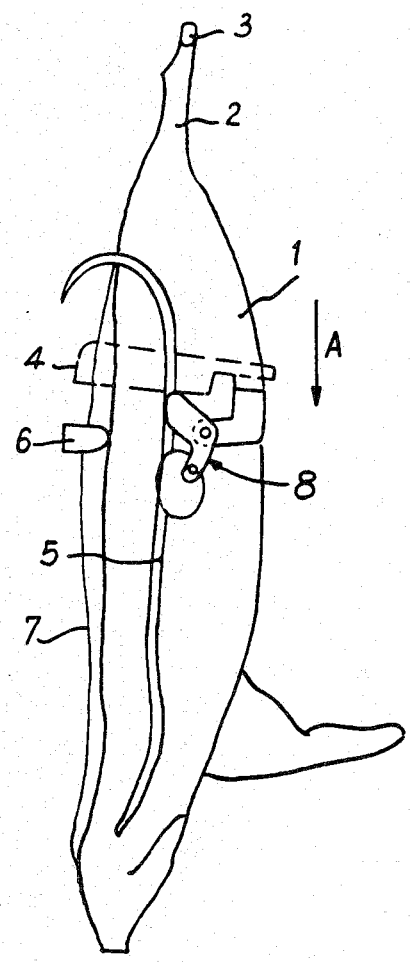

United States Patent [19]

Menqi

[11] Patent Number: 4,667,368
[45] Date of Patent: May 26, 1987

[54] BACKBONE INNER GUIDING DEVICE FOR SPLITTING BUTCHERY ANIMALS

[75] Inventor: Genevray C. Menqi, Guebwiller, France

[73] Assignee: N. Schlumberger & Cie, Guebwiller, France

[21] Appl. No.: 802,175

[22] Filed: Nov. 26, 1985

[30] Foreign Application Priority Data

Nov. 29, 1984 [FR] France .................................. 84 18185

[51] Int. Cl.⁴ ............................................... A22B 5/20
[52] U.S. Cl. ................................................... 17/23
[58] Field of Search ............................................. 17/23

[56] References Cited

U.S. PATENT DOCUMENTS

| 637,490 | 11/1899 | Tower et al. | 17/23 |
| 4,262,388 | 4/1981 | Durano et al. | 17/23 X |
| 4,455,712 | 6/1984 | Skaiaa | 17/23 |

Primary Examiner—Willie G. Abercrombie
Attorney, Agent, or Firm—Peter L. Berger

[57] ABSTRACT

The device includes a rocker lever pivoted on a support and carrying at one end a first guiding surface for cooperating directly with the inner face of the backbone at at least one point and, at the other end, a pad pivoted on the rocking lever and having a second guiding surface spaced apart from the first surface and provided for cooperating directly with said inner face at at least two points.

11 Claims, 5 Drawing Figures

BACKBONE INNER GUIDING DEVICE FOR SPLITTING BUTCHERY ANIMALS

The invention relates to a backbone inner guiding device in installations for automatic splitting of butchery animals.

In these installations, the carcass of the animal is hung by its rear legs to a conveyor and is split longitudinally, from top to bottom, by a cutting member, generally a cleaver, separating it into two equal portions.

Various guiding devices are known for ensuring that the backbone presents itself and is maintained in front of the cutting member. Since a very long time, it has been established that the best guiding is provided by chosing an inner guiding device and an outer guiding device, the first device cooperating with the inner face of the backbone and the second device cooperating with the animal back.

U.S. Pat. No. 637,490 discloses a double guiding device comprising an outer roller and an inner rectilinear pad. In said device, the backbone is consequently maintained and guided at the same time outwardly and inwardly; however, due to the fact that the inner pad is rectilinear, it does not allow to accomodate easily deformations of the backbone, whether natural or resulting from malformations.

In order to attempt to remedy this disadvantage, it has been proposed to replace the inner pad by a crescent-shape rocking lever equipped at each end with a grooved roller. This device provides better results but, since the inner guiding is only provided by supporting two points of the backbone, it does not allow straightening the backbone when affected with lateral deformations, this being reflected, above the upper roller, by a presentation of the backbone in a bad position in front of the cutting member.

The object of the invention is to remedy these disadvantages by providing an inner guiding device maintaining perfectly the backbone whatever the deformations of said backbone.

To this effect, the guiding device according to the invention is characterized in that it comprises a rocking lever pivoted on a support and carrying at one end a first guiding surface provided for cooperating directly with the inner face of the backbone at at least one point and at the other end a pad pivoted to the rocking lever and having a second guiding surface adapted for cooperating directly with said inner surface at at least two points.

Preferably, the first surface is situated in the upper portion of the rocking lever and the pad is pivoted at the lower portion of said lever.

One at least of said surfaces can be substantially rectilinear and, for a rectilinear position of the backbone, the two surfaces can be in alignment.

For the passage of the protruding portions of the vertebrae, the two surfaces are recessed in the shape of a V, the V being formed with smooth faces or with stepped faces. The V profiles can be identical or different for the two surfaces.

In order to facilitate the coming in engagement of the backbone with the two surfaces, said surfaces have curved engagement ends in order to accomodate the deformations of the backbone.

Figure 4:
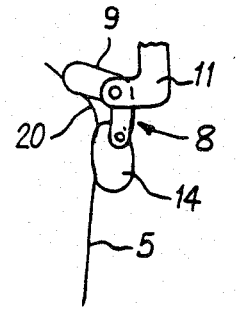
Figure 5:
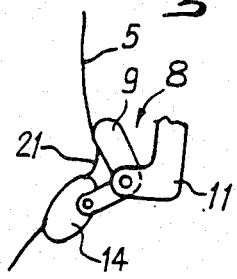
Figure 2:
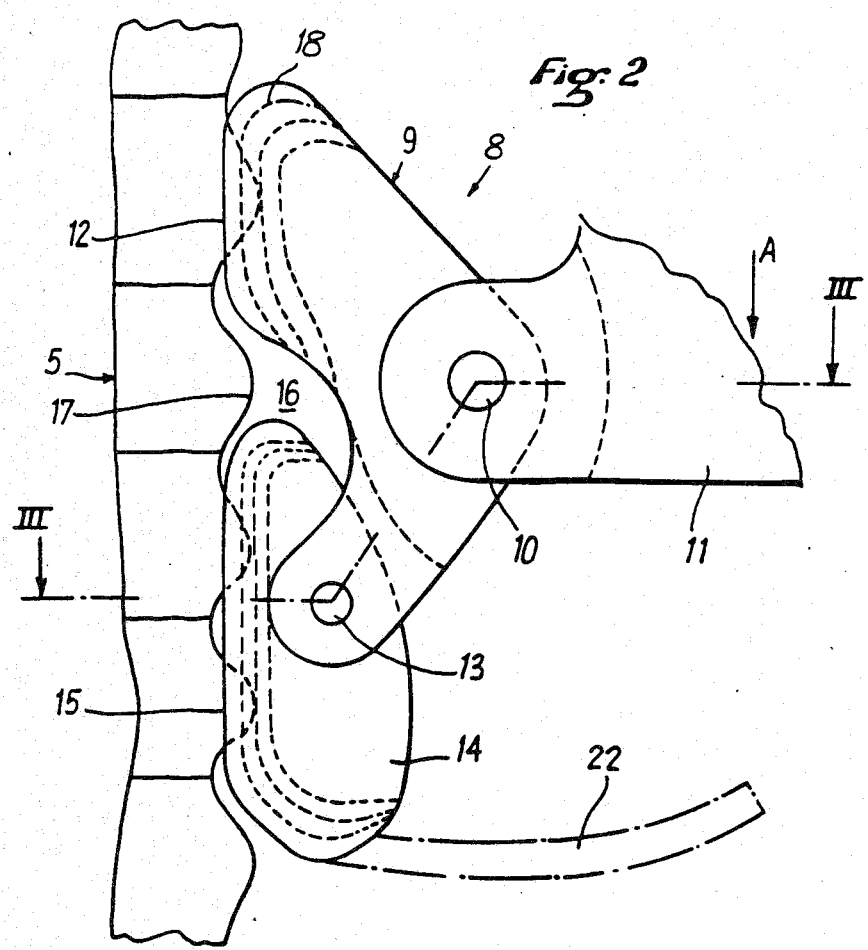
Figure 3:
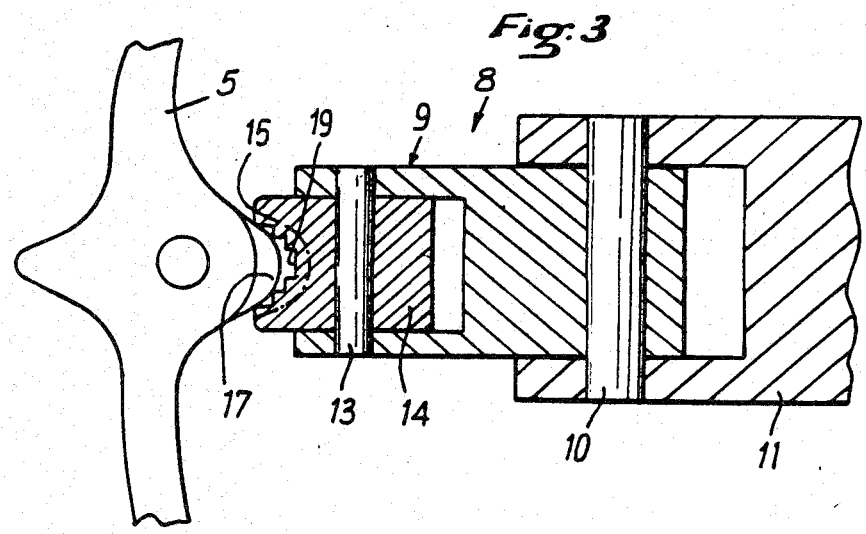

The invention will become more apparent after reading the following description, with reference to the accompanying drawings wherein:

FIG. 1 is a schematic side view showing a guiding device according to the invention, cooperating with the carcass of a butchery animal, FIG. 2 is a side view at a larger scale of the guiding device of FIG. 1, FIG. 3 is a sectional view along broken line III—III of FIG. 2, and FIGS. 4 and 5 show schematically the position of the guiding device for the passage of two inflexion points of the backbone.

In FIG. 1 is shown schematically the carcass 1 of a butchery animal hung by its spread apart rear legs 2 to a conveyor schematically shown at 3. In known manner, the splitting of the carcass 1 into two equal halves is carried out with the assistance of a cutting member 4, for example of the cleaver type, introduced between the rear legs 2 and moving downwardly vertically along direction A while being actuated so as to accomplish an appropriate motion with respect to its support (not shown). In order that the backbone 5 be presented correctly in the cutting plane, there is provided, in a general known manner, a guiding device 6 applying a pressure in the central region of the animal back 7, and a guiding device 8 applying a pressure on the inner face of the backbone.

As shown in FIGS. 2 and 3, the inner guiding device 8 according to the invention includes a rocking lever 9 pivoted at 10 about a horizontal transverse axis, perpendicular to direction A, on a support 11 which moves along direction A and also carries the cutting member 4 and its operating means, said cutting member and operating means not being shown in FIGS. 2 and 3.

At one end, the rocking lever 9 is formed with a first guiding surface 12 for cooperating directly with the inner face of backbone 5 at at least one point, and it carries, at its other end, about an articulation 13 having an axis parallel to that of articulation 10, a pad 14 formed with a second guiding surface 15, spaced apart from the first surface 12 in the direction A and also adapted for cooperating directly with the backbone inner face at at least two points.

In the embodiment shown, the first surface 12, which is part of rocking lever 9, is formed at the upper end of said lever, while pad 14 is provided at the lower end.

The rocking lever 9 is in the shape of an angled lever so that, between the lower end of upper surface 12 and the upper end of lower surface 15, is left a void space 16 having a size of 20 to 70 mm in direction A, for accomodating the deformations of backbone 5.

As shown, surfaces 12 and 15 can be substantially rectilinear. Moreover, their ends are preferably rounded or curved for facilitating the beginning of their engagement with the backbone. As shown in FIG. 2, and assuming that the backbone 5 is rectilinear, surfaces 12 and 15 are in alignment.

In order to allow the passage of the inner protrusions 17 of the backbone verterbrae, surfaces 12, 15 are recessed so as to be formed with a V-shaped cavity 18, 19 in which said protrusions 17 lodge themselves. Cavities 18, 19 can have faces with steps, as shown, or alternatively smooth faces.

In a typical example, the upper surface 12 has an active length of about 25 mm and the lower surface 15 has an active length of about 60 mm, so that, in general, the upper surface 12 cooperates with a single verterbrae while the lower surface 15 cooperates with at least two verterbrae the device according to the invention providing thereby an inner support for at least three verterbrae.

With such an arrangement, since at least two successive verterbrae are maintained in the correct position parallel to direction A by the lower surface 15, the backbone is correctly straightened and is presented to the cutting member, which is situated just above upper surface 12, in a perfect position. During the cutting operation, the upper surface 12 only plays a support role for the backbone in the correct position which is provided by the lower surface 15.

The device according to the invention allows therefore accomodating correctly lateral deformations or scolioses of the backbone.

There is shown schematically in FIGS. 4 and 5 the passage of the device according to the invention in the region of the two inflexion points 20, 21 of the backbone, said points being in the vicinity of the ends of said backbone. Due to the articulation of rocking lever 9 on support 11 and to the articulation of pad 14 on the rocking lever, said inflexion points are passed without difficulty, the guiding device conforming perfectly to the backbone profile.

A tail 22, fixedly provided at the lower end of pad 14 and allowing said pad to rock when it reaches the end of its downward stroke in the vicinity of the head, has been shown in chain-dot lines in FIG. 2.

I claim:

1. In a backbone inner guiding device for splitting butchery animals, comprising:
   a rocking lever pivoted on a support;
   a first guiding surface carried at one end to said rocking lever and adapted for cooperating directly with the backbone inner face at at least one point; and
   a second guiding surface spaced apart from said first guiding surface and adapted for cooperating directly with said inner face,
   the improvement comprising:
   said second guiding surface is provided on a pad pivoted on said rocking lever, and
   said second guiding surface is adapted to cooperate with said inner face at at least two points.

2. A device according to claim 1, wherein the first guiding surface is situated in the upper portion of the rocking lever and the pad is pivoted at the lower end of said lever.

3. A device according to one of claims 1 and 2, wherein at least one of said surfaces is substantially rectilinear.

4. A device according to claim 3, wherein, for a rectilinear position of backbone, surfaces are substantially in alignment.

5. A device according to one of claims 1 and 2, wherein the guiding surfaces are recessed substantially in the shape of a V.

6. A device according to claim 5, wherein the faces of the V are stepped.

7. A device according to claim 5, wherein the faces of the V are smooth.

8. A device according to claim 5, wherein the V's of the two surfaces are identical.

9. A device according to claim 5, wherein the V's of the two surfaces are different.

10. A device according to one of claims 1 and 2, wherein the ends of the guiding surfaces are curved in order to accomodate the backbone deformations and to facilitate the coming in engagement of said backbone with the guiding surfaces.

11. A device according to one of claims 1 and 2, wherein pad is formed at its lower end with a rocking tail.

* * * * *